United States Patent [19]

Seto et al.

[11] 4,388,341

[45] Jun. 14, 1983

[54] PROCESS FOR PREPARATION OF FISH MEAT-LIKE FLAKY FOODS

[75] Inventors: Akira Seto; Takashi Sakita, both of Yokohama, Japan

[73] Assignee: Nisshin Oil Mills, Limited, Tokyo, Japan

[21] Appl. No.: 237,055

[22] Filed: Feb. 23, 1981

[30] Foreign Application Priority Data

Feb. 21, 1980 [JP] Japan .................................. 55-19736

[51] Int. Cl.$^3$ ................................................. A23J 3/00
[52] U.S. Cl. .................... 426/656; 426/652; 426/506; 426/512; 426/802
[58] Field of Search ............... 426/104, 652, 656, 802, 426/506, 512

[56] References Cited

U.S. PATENT DOCUMENTS

| | | | |
|---|---|---|---|
| 3,870,805 | 3/1975 | Hayes et al. | 426/802 X |
| 3,914,455 | 10/1975 | Valentas et al. | 426/802 X |
| 3,961,083 | 6/1976 | Coleman | 426/802 X |
| 4,103,034 | 7/1978 | Ronai et al. | 426/802 X |

OTHER PUBLICATIONS

UK Patent Application, GB 2,006,606A, 05/10/79.

*Primary Examiner*—Robert A. Yoncoskie
*Attorney, Agent, or Firm*—Sughrue, Mion, Zinn, Macpeak and Seas

[57] ABSTRACT

A fish meat-like flaky food is obtained by treating a granular vegetable protein with warm water containing an alkaline earth metal salt, molding the treated granular vegetable protein to a flake, washing and dehydrating the flake, and seasoning the flake. As the alkaline earth metal salt, there are used calcium or magnesium salts of sulfuric acid, hydrochloric acid, phosphoric acids and organic acids.

6 Claims, No Drawings

PROCESS FOR PREPARATION OF FISH MEAT-LIKE FLAKY FOODS

BACKGROUND OF THE INVENTION (1) Field of the Invention:

The present invention relates to a process for the preparation of fish meat-like flaky foods by using as the main raw material a granular vegetable protein which is available in abundance and is cheap in price.

(2) Description of the Prior Art:

Meats of fishes such as tuna, bonito, salmon and trout are used for food after cooking such as roasting or boiling or as slices of raw fish. Furthermore, boiled and oil-soaked meats of these fishes are marketed in large quantities in the form of canned foods. These canned foods are used for salad ingredients, sandwiches, spreads, fish coroquettes and ingredients of seasoned boiled rice, and the demands for these canned foods have recently been increasing.

Supplies of high-class fishes such as tuna, bonito, salmon and trout are recently insufficient because of catch limitations and the like. Accordingly, meat products of these fishes become expensive.

As means for compensating this disadvantage, trials have heretofore been made to obtain fish meat-like foods from cheap raw materials. For example, there can be mentioned a method in which a low-class fish such as sardine or mackerel is used as the raw material. In this method, since the size of the starting fish is small, the step of collecting fish meat is complicated, and meat of such fish is lean meat and has a strong smell and such low-class fish is not suitable as a substitute of high-class fish such as tuna, bonito, salmon or trout.

A method in which chicken meat is used for the production of a fish meat-like food has been examined. However, since the eating touch and flavor of chicken meat are different from those of fish meat, this method has hardly been actually worked.

Furthermore, use of a hydrate of a granular vegetable protein has once been tried. However, since the appearance, eating touch and flavor of such vegetable protein are different from those of fish meat, this trial has not practically been worked.

SUMMARY OF THE INVENTION

Under such background, we made researches with a view to developing a process capable of producing fish meat-like flaky foods resembling fish meat flakes in the appearance, eating touch and flavor at low costs, and we found that if a granular vegetable protein is subjected to a certain treatment in the presence of a small amount of an alkaline earth metal salt, a food resembling a fish meat flake can be obtained. We have now completed the present invention based on this finding.

More specifically, in accordance with the present invention, there is provided a process for the preparation of fish meat-like flaky foods, which comprises hydrating a granular vegetable protein in warm water containing an alkaline earth metal salt, forming the hydrated protein into a flake by physical means, and washing, dehydrating and seasoning the flake.

DETAILED DESCRIPTION OF THE PREFERRED EMBODIMENTS

A granular vegetable protein prepared by a customary method from a protein composition obtained from soy bean or wheat is used as the granular vegetable protein in the present invention. It is preferred that a granular vegetable protein having a relatively large size of about 3 to about 10 mesh be used. If the size of the granular vegetable protein is smaller than 10 mesh, the resulting flake is too small and is inferior in the appearance and eating touch. If the size of the granular vegetable protein is larger than 3 mesh, it becomes difficult to mold the protein into a flake.

As the alkaline earth metal salt, there are used calcium and magnesium salts of sulfuric acid, hydrochloric acid, phosphoric acid and organic acids, and mixtures of two or more of these salts. The concentration of the salt in warm water is preferably about 0.3 to about 1%, and the temperature of warm water containing such salt is preferably about 70° to about 100° C. It is preferred that warm water be used in an amount 5 to 15 times the amount of the granular vegetable protein.

As physical means for molding the granular vegetable protein into a flake, there is used a juice mixer or silent cutter provided with a blade having a thickness of 2 to 5 mm, and it is preferred that the treatment be conducted for 5 to 30 minutes by using such physical means. If the treating time is too long, once formed flakes are broken into fine pieces, and the intended object of the present invention cannot be attained. Therefore, the above-mentioned treatment should be stopped at the point when the granular vegetable protein becomes flaky. If the thickness of the cutting blade is too small, the granular vegetable protein is broken into fine pieces. Accordingly, the use of a cutting blade having a thickness in the above-mentioned range is preferred.

Warm water containing the alkaline earth metal salt has a function important for formation of flakes. More specifically, if the granular vegetable protein is treated in warm water free of the alkaline earth metal salt, the granular vegetable protein is extremely swollen and is readily broken into fine pieces, and a flaky products is hardly obtained. Moreover, the obtained product is inferior in the eating touch and flavor. If a small amount of the alkaline earth metal salt is added to warm water according to the present invention, the protein reacts with an alkaline earth metal ion to increase the toughness of the texture of the protein and a granule having a size suitable for formation of a flake can be obtained. Furthermore, if warm water is employed, the reactivity of the alkaline earth metal salt is enhanced and a flake having a better shape than the shape of a flake obtained by using cold water can be obtained. The so formed flake is washed and dehydrated to remove saccharides and minute amount components which are smell components of the vegetable protein, whereby the flavor and eating touch are improved.

The flake is dehydrated by a centrifugal dehydrator or the like so that the water content is reduced to about 60 to about 80%, and the dehydrated flake is then seasoned. For example, with stirring in a mixing machine, up to 30 parts of an edible oil and 10 to 30 parts of a seasoning liquid are added to 100 parts of the dehydrated flake.

According to the process of the present invention which has hereinbefore been described, a fish meat-like flaky food can be prepared from a granular vegetable protein which has been used as a substitute for minced meat. Accordingly, the present invention can provide a new food material at a low cost in the field of marine food products where shortage of resources will be inevitable in the future. Therefore, the present invention is industrially very significant.

The present invention will now be described in detail with reference to the following Examples that by no means limit the scope of the invention.

EXAMPLE 1

[A] 100 parts of a granular soy bean protein having a size of 3 to 5 mesh was sufficiently hydrated in warm water maintained at 90° C. The amount of warm water was 10 times the amount of the granular soy bean protein. The hydrated protein was charged in a silent cutter provided with a cutting blade having a thickness of 5 mm and treated at a rotation number of 500 rpm for 15 minutes. The water washing-draining operation was conducted twice, and the dehydration treatment was carried out in a dehydrator so that the water content was reduced to 70 %.

[B] 100 parts of a granular soy bean protein having a size of 3 to 5 mesh was sufficiently hydrated in warm water containing 0.5 % of calcium sulfate and maintained at 90° C. The amount of warm water was 10 times the amount of the protein. The hydrated protein was treated in the same manner as described in [A] above.

Shapes of the flakes obtained in [A] and [B] above are shown in Table 1.

TABLE 1

| Shapes of Flakes | Flake [A] | Flake [B] |
|---|---|---|
| Average length (mm) | 2.0 | 6.0 |
| Average width (mm) | 0.8 | 1.0 |
| Average thickness (mm) | 0.1 | 0.2 |

The product obtained without addition of calcium sulfate was too fine and was not suitable as a substitute for a fish meat flake. If calcium sulfate was added at the dehydration treatment, a product of a long shape resembling a fish meat flake was obtained.

EXAMPLE 2

100 parts of a granular soy bean protein having a size of 3 to 5 mesh was sufficiently hydrated in warm water containing 0.5 % of calcium sulfate and maintained at 80° C. The amount of warm water was 10 times the amount of the protein. The hydrated protein was charged in a juice mixer provided with a cutting blade having a thickness of 5 mm and was treated at a rotation number of 2000 rpm for 5 minutes. The water washing-draining operation was conducted twice, and dehydration treatment was carried out in a dehydrator, so that the water content was reduced to 75 %. The obtained flaky product was seasoned according to a recipe shown in Table 2, to obtain a tuna flake-like food.

TABLE 2

| Recipe for Tuna Flake-Like Food | Parts |
|---|---|
| Flaky product | 100 |
| Tuna extract | 3 |
| Sodium glutamate | 0.1 |
| Table salt | 1 |
| Refined soy bean oil | 20 |
| Water | 20 |

In order to evaluate the quality of the so prepared tuna flake-like food, a commercially available canned oil soaked tuna flake (C) (sold under the tradename "Hagoromo jirushi" by Hagoromo Kanzume K. K.) was compared with a 1/1 mixture (D) of this commercially available tuna flake and the above tuna flake-like food by a panel of 20 experts.

The two products were ranked with respect to the eating touch, flavor and appearance so that point of 1 was given to the better one and point of 2 was given to the other, and the sums of the total ranking points given to both the products are shown in Table 3.

TABLE 3

| Results of Evaluation of Tuna Flake-Like Product | (C) | (D) |
|---|---|---|
| Eating touch | 29 | 31 |
| Flavor | 39 | 21 |
| Appearance | 38 | 22 |

The above results were analyzed according to the method of Kramer. Since the relation of $K_2^{20}$ (0.05)=26–34 was established with respect to the flavor and appearance, it was judged that the product (D) containing the flaky food of the present invention was significantly better with a significance level of 5 %. In connection with the flavor, the taste per se of the tuna flake (C) was better than that of the product (D), but many experts judged the product (D) as being better because the fish smell of the tuna flake (C) was too strong. In connection with the appearance, since the product (D) was in the form of a white flake and excellent in the shape of the flake, many experts judged the product (D) as being better.

In connection with the eating touch, there was observed no substantial difference.

From the foregoing results, it was confirmed that the food product prepared according to the present invention can be used as a substitute for a fish meat flake.

EXAMPLE 3

100 parts of a granular soy bean protein having a size of 3 to 5 mesh was sufficiently hydrated in warm water containing 0.3 % of calcium chloride and maintained at 70° C. The amount of warm water was 10 times the amount of the protein. The hydrated protein was charged in a silent cutter provided with a cutting blade having a thickness of 5 mm and treated at a rotation number of 500 rpm for 15 minutes. The water washing-draining operation was conducted twice, and the dehydration treatment was carried out in a dehydrator, so that the water content was reduced to 70 %.

The obtained flake was seasoned according to a recipe shown in Table 4, to obtain a salmon flake-like food.

TABLE 4

| Recipe for Salmon Flake-Like Food | Parts |
|---|---|
| Flaky product | 100 |
| Salmon extract | 3 |
| Sodium glutamate | 0.2 |
| Table salt | 3 |
| Refined soy bean oil | 10 |
| Water (containing coloring material) | 20 |

A commercially available canned salmon flake (E) (sold under the tradename "Akebono jirushi" by Nichiro Gyogyo K. K.) was compared with a 1/1 mixture (F) of this commercially available product and the above salmon flake-like food by a panel of 20 experts, so as to evaluate the above salmon flake-like food.

The two products were ranked with respect to the eating touch, flavor and appearance, so that point of 1 was given to the better one and point of 2 was given to the other, and the sums of the total ranking points given to both the products are shown in Table 5.

TABLE 5

| Results of Evaluation of Salmon Flake-Like Product | | |
|---|---|---|
| | (E) | (F) |
| Eating touch | 28 | 32 |
| Flavor | 29 | 31 |
| Appearance | 30 | 30 |

The above results were analyzed according to the method of Kramer. There was found no significant difference in any of the eating touch, flavor and appearance.

EXAMPLE 4

100 parts of a granular soy bean protein having a size of 3 to 5 mesh and warm water containing 0.5 % of calcium sulfate and maintained at 80° C. in an amount 10 times the amount of the protein were charged in a juice mixer provided with a cutting blade having a thickness of 5 mm, and the mixture was treated at a rotation number of 2000 rpm for 5 minutes. The water washing-draining operation was conducted twice and the dehydration operation was conducted twice, so that the water content was reduced to 70 %.

The obtained flaky product was seasoned according to a recipe shown in Table 6, to obtain a tuna flake-like food.

TABLE 6

| Recipe for Tuna Flake-Like Food | |
|---|---|
| | Parts |
| Flaky product | 100 |
| Tuna extract | 3 |
| Sodium glutamate | 0.1 |
| Table salt | 1 |
| Refined soy bean oil | 20 |
| Water | 20 |

EXAMPLE 5

100 parts of a granular soy bean protein having a size of 3 to 5 mesh and warm water containing 0.5 % of magnesium sulfate and maintained at 80° C. in an amount 10 times the amount of the protein were treated in the same manner as described in Example 4, so that the water content was reduced to 70 %.

The so obtained flaky product was seasoned according to a recipe shown in Table 6, to obtain a tuna flake-like food product.

What is claimed is:

1. A process for preparing a simulated fish-like food flake, comprising the steps of:
   providing granulated vegetable protein material having a particle size of about 3 to 10 mesh;
   hydrating the granular material in water of about 70° C. to 100° C. having alkali earth metal salt therein in a concentration of about 0.3 to about 1% for a time sufficient to at least toughen said material for forming into flakes;
   forming said hydrated granular material into flakes;
   washing said flakes; and
   dehydrating to a level of about no less than 60% water content and seasoning said flakes.

2. A process claimed in claim 1, wherein said water at said temperature of about 70° to 100° C. is utilized in an amount of about 5 to 15 times the amount of the granular material.

3. A process as claimed in claim 1, wherein said hydrated protein material is formed with a cutting means having a blade which has a thickness of 2 to 5 mm.

4. A process as claimed in claim 1 wherein, said dehydrating is carried out in a centrifugal dehydrator wherein the water content is reduced to about 60 to about 80%.

5. A process as claimed in any of claims 1-4, wherein said alkali earth metal salt is a salt selected from the group consisting of calcium and magnesium salts of sulfuric acid, hydrochloric acid, phosphoric acid and organic acids.

6. A process as claimed in claim 3, wherein said cutting means treatment is conducted for 5 to 30 minutes.

* * * * *